United States Patent
Fisher et al.

(10) Patent No.: US 7,219,273 B2
(45) Date of Patent: May 15, 2007

(54) METHOD FOR TESTING MEDIA IN A LIBRARY WITHOUT INSERTING MEDIA INTO THE LIBRARY DATABASE

(75) Inventors: James Arthur Fisher, Tucson, AZ (US); Anthony Andrew Lambert, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 10/644,209

(22) Filed: Aug. 20, 2003

(65) Prior Publication Data

US 2005/0044456 A1 Feb. 24, 2005

(51) Int. Cl.
G11C 29/08 (2006.01)
G11C 29/50 (2006.01)

(52) U.S. Cl. ...................... 714/718; 714/736

(58) Field of Classification Search ................ 714/700, 714/718, 721, 722, 724, 736, 738, 742, 42, 714/54, 763; 360/26, 47, 53

See application file for complete search history.

(56) References Cited

U.S. PATENT DOCUMENTS

| | | | |
|---|---|---|---|
| 4,657,197 A | 4/1987 | Farrow | |
| 4,863,115 A | 9/1989 | Graham | |
| 4,876,662 A | 10/1989 | Pence | |
| 5,057,961 A | 10/1991 | Rayis | |
| 5,421,697 A | 6/1995 | Ostwald | |
| 5,517,036 A | 5/1996 | Semba | |
| 5,561,530 A * | 10/1996 | Kanazawa | 386/46 |
| 5,579,234 A * | 11/1996 | Wiley et al. | 702/118 |
| 5,721,665 A | 2/1998 | Schultz | |
| 5,774,725 A * | 6/1998 | Yadav et al. | 717/135 |
| 5,895,438 A | 4/1999 | Yomtoubian | |
| 6,088,182 A * | 7/2000 | Taki et al. | 360/71 |
| 6,247,096 B1* | 6/2001 | Fisher et al. | 711/114 |
| 6,417,977 B1 | 7/2002 | Ohta et al. | |
| 6,539,459 B1* | 3/2003 | Tadokoro et al. | 711/154 |

FOREIGN PATENT DOCUMENTS

JP 2001319399 A 11/2001

OTHER PUBLICATIONS

D.T. Feriozi, "Unconditional Installation of SCSI Device Drivers" IBM TBD's, vol. 37 No. 04A (Apr. 1994).

* cited by examiner

*Primary Examiner*—Guy Lamarre
*Assistant Examiner*—Dipakkumar Gandhi
(74) *Attorney, Agent, or Firm*—Law Office of Charles W. Peterson, Jr.; Dale M. Crockatt; Jennifer M. Anda

(57) ABSTRACT

A storage subsystem, method of testing storage media in the storage subsystem and program product therefor. The storage media, e.g., magnetic tape in a physical volume, is inserted into an input area in the storage subsystem, but not loaded into the subsystem library. The media input area on the physical volume is scanned and a test command is queued. The test storage media is moved to a drive for testing. After testing, the storage media is returned to the input area.

20 Claims, 5 Drawing Sheets

METHOD FOR TESTING MEDIA IN A LIBRARY WITHOUT INSERTING MEDIA INTO THE LIBRARY DATABASE

BACKGROUND OF THE INVENTION

1. Field of the Invention

The present invention is related to a mass storage device and more particularly to a mass storage device with removable storage media and methods of testing the removable storage media.

2. Background Description

Data storage systems administering data stored on removable storage media, such as an automated storage media (e.g., tape cartridges) and retrieval library for storing and accessing removable storage media, are well known in the art. Typically, there was no efficient way to test storage media for such storage systems to find out if the media is viable. Testing storage media in a tape library required inserting the media into the library database, performing the test, and ejecting the media. Testing was not possible when the library is full. Normally, hosts systems administered physical volumes in connected data storage subsystems. The hosts loaded volume information into a tape configuration database, a tape management systems database and, perhaps, into a virtual media server database and library manger database in the storage subsystem as well. This time and resource consuming process was necessary to test media for viability. Also, media could not be tested if the library were full.

Thus, there is a need for a storage media device capable of testing whether storage media is viable and in particular, even when a storage library in the storage media device testing the media is full.

SUMMARY OF THE INVENTION

It is a purpose of the invention to test storage media viability;

It is another purpose of the invention to test removable storage media viability in a data storage system employing media being tested;

It is yet another purpose of the invention to test removable storage media viability in a data storage system even when a data library of data volumes stored on removable storage media is full, and so, incapable of inserting additional removable storage media volumes.

The present invention relates to a storage subsystem, method of testing storage media in the storage subsystem and program product therefor. The storage media, e.g., magnetic tape in a physical volume, is inserted into an input area in the storage subsystem, but not loaded into the subsystem library. The media input area is scanned for physical volumes and a test command is queued for media found. The test storage media is moved to a drive for testing. After testing, the storage media is returned to the input area and the test results may be displayed.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
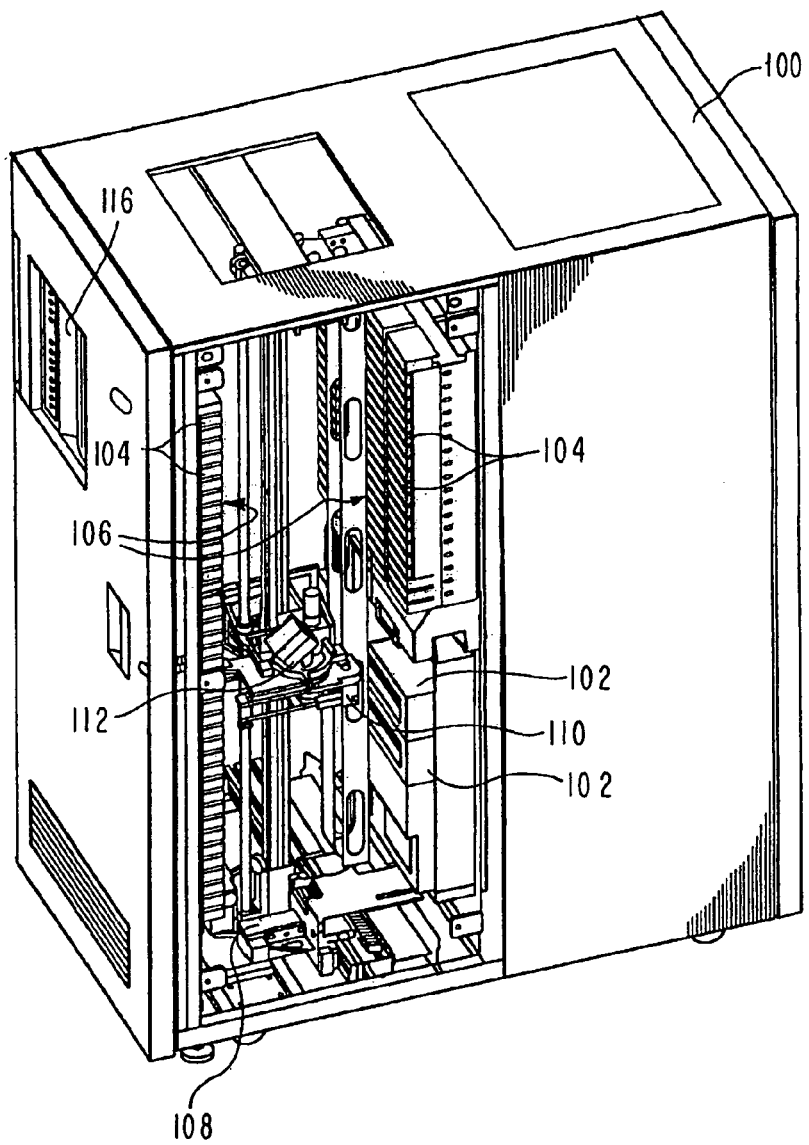
FIG. 1 shows an example of a preferred data storage subsystem, wherein storage media volumes are tested for viability independent of and prior to insertion in the library.

Turning now to the drawings and, more particularly, FIG. 1 shows an example of a preferred data storage subsystem 100, such as an automated storage media (e.g., tape cartridges) and retrieval library for storing and accessing storage media, wherein physical volumes of storage media are tested for viability independent of and prior to insertion in the library. Although for simplicity of description, application of the present invention is described with reference to a tape cartridge storage subsystem 100, this is for example only. Thus, the present invention has application to any suitable storage subsystem with removable storage media. Further, storage media may be magnetic storage media such as magnetic tape, magnetic disk, optical storage such as compact disk (CD) or digital versatile disk (DVD), or any suitable equivalent non-volatile or volatile storage media.

In this example the data storage subsystem 100 includes one or more drive units 102 for reading and/or writing data on the physical volumes, e.g., the data storage subsystem 100 may be an IBM 3494 Tape Library Dataserver. Physical volumes or media cartridges 104 may be stored in storage cells in a bulk input or bulk storage rack 106. Typically, a single physical volume 104 can be individually addressed and accessed by a volume serial number (volser). An accessor 108 transports a selected physical volume 104 between a storage cell in bulk input rack 106 and a drive 102. The accessor 108 includes a cartridge gripper 110 for gripping and holding the physical volume 104 during transport. A bar code scanner 112, or similar visual input unit, is mounted on the gripper 110, to "read" labels identifying cartridges with a corresponding volume serial number. An operator console may be included for manual (operator) input, e.g., by an operator interacting with the library or starting media testing. A convenience input/output (I/O) station 116 may also be included for introducing media for testing. As noted hereinabove and depending upon the particular storage media, the drives 102 can be optical disk drives or magnetic disk or tape drives. Correspondingly, the physical volumes 104 can be cartridges or cassettes containing optical or magnetic media (e.g., magnetic tape) or any other suitable removable media and associated drives.

Thus, according to a preferred embodiment of the present invention, the data storage subsystem 100 tests media viability, e.g., of a tape cartridge 104 newly inserted in a storage cell in bulk storage rack 106 or convenience I/O station 116, without and before inclusion in the local data storage library. So, for example, a customer can insert the untested media in the convenience I/O station 116 or into a storage cell in bulk storage rack 106. The media label is scanned, e.g., by bar code scanner 112, which identifies any cartridges that are present for testing and their volser labels. Then, the media is mounted on the drive 102 and tested for viability using the media input area as storage during the media test. Alternately, the cartridge may be scanned at the drive 102 and the scan results returned to verify which volume was tested.

Figure 2:
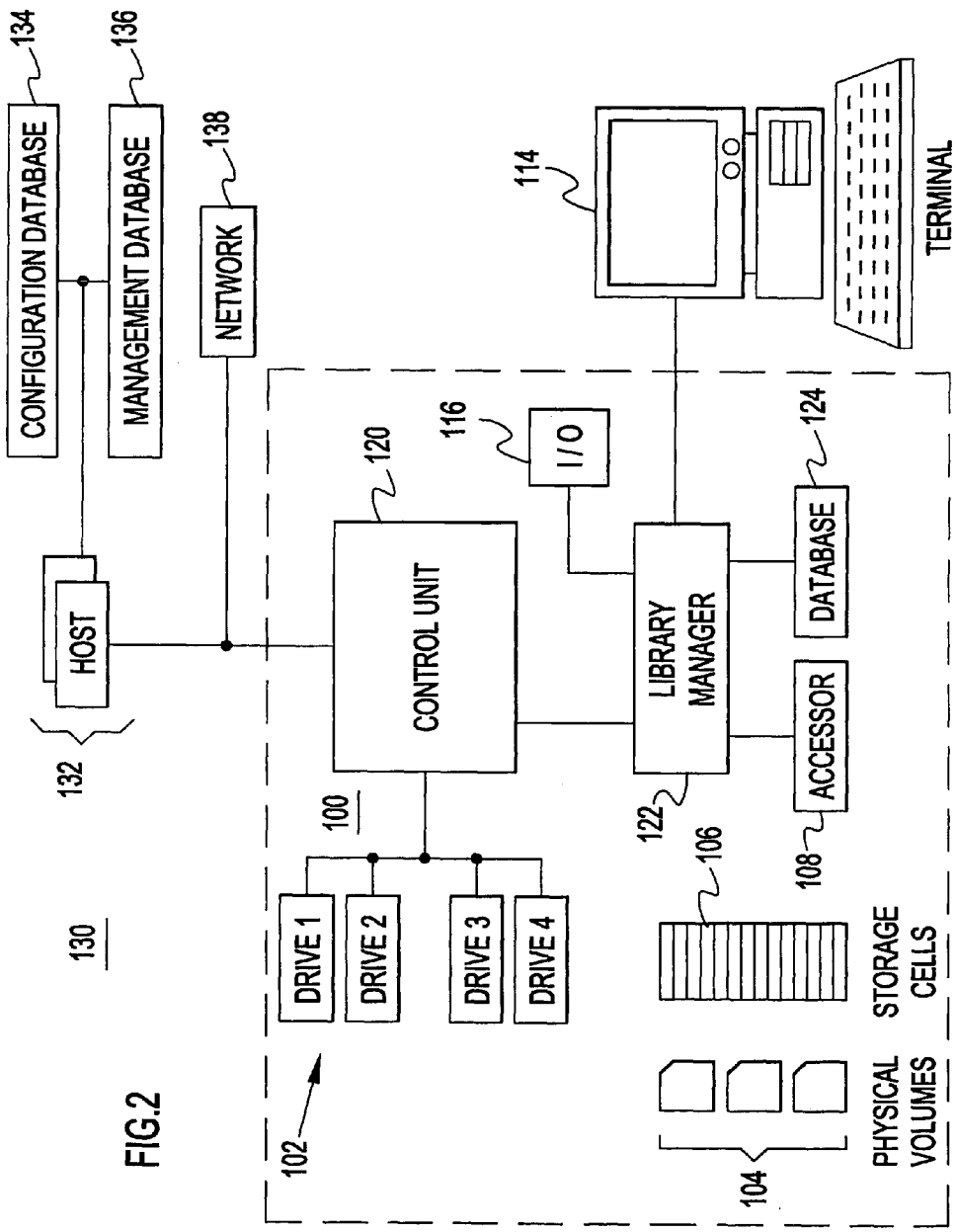
FIG. 2 shows an example of block diagram of a preferred data storage subsystem connected to host systems.

FIG. 2 shows an example of block diagram of a preferred data storage system 130 including data storage subsystem 100, such as in the example of FIG. 1 in more detail with like elements labeled identically, connected to host systems 132. The data storage subsystem 100 includes a control unit 120 and library manager (LM) 122. Preferably, the control unit 120 and library manager 122 are in software or firmware, e.g., in microcode stored in read only memory (ROM), running on a typical general purpose processor or processors, microprocessor(s) or embedded processor(s). The control unit 120 controls drive load/unload and related actions of drives 102 and passes host requests to the library manager 122.

An operator can communicate through operator console 114 with the library manager 122, which controls the accessor 108. A library manager database 124 stores tables and programs for controlling the accessor 108 and includes a table that locates physical volumes 104 in the storage cells. The library manager 122 uses the library manager database 124 for controlling the accessor 108 in retrieving each selected physical volume 104 from its storage cell. Host systems 132 send requests through the control unit 120 to the library manager 122.

Host systems 132 typically include a data storage system administration program managing a tape configuration database 134 and a tape management systems database 136. Also, typically, the host systems 132 connect over a network 138 to other networked devices (not shown). The data storage system administration program uses the tape configuration database 134 to manage the volumes associated with each data storage subsystem 100 coupled to the particular host 132. The data storage system administration program uses the tape management system database 136 to manage data sets residing on the volumes, including the expiration, owner, access, etc. In addition, the tape configuration database includes a system volume catalog of other data relating to the volumes.

Previously, the hosts 132 administered every physical volume loaded into the tape configuration database 134, the tape management systems database 136 and, perhaps, the library manger database 124 as well. In addition to consuming both time and resources, though previously unavoidable, entries in these databases 124, 134, 136 are unnecessary just to test media for viability. Advantageously, however, a preferred data storage subsystem 100 avoids this waste of time and resources for media testing by using the media input area, i.e., bulk storage rack 106 and convenience I/O station 116, as temporary storage during the media test. Thus, the host systems 132 are unaware of the presence of test media and test media are tested transparently to the host systems 132.

Figure 3A:
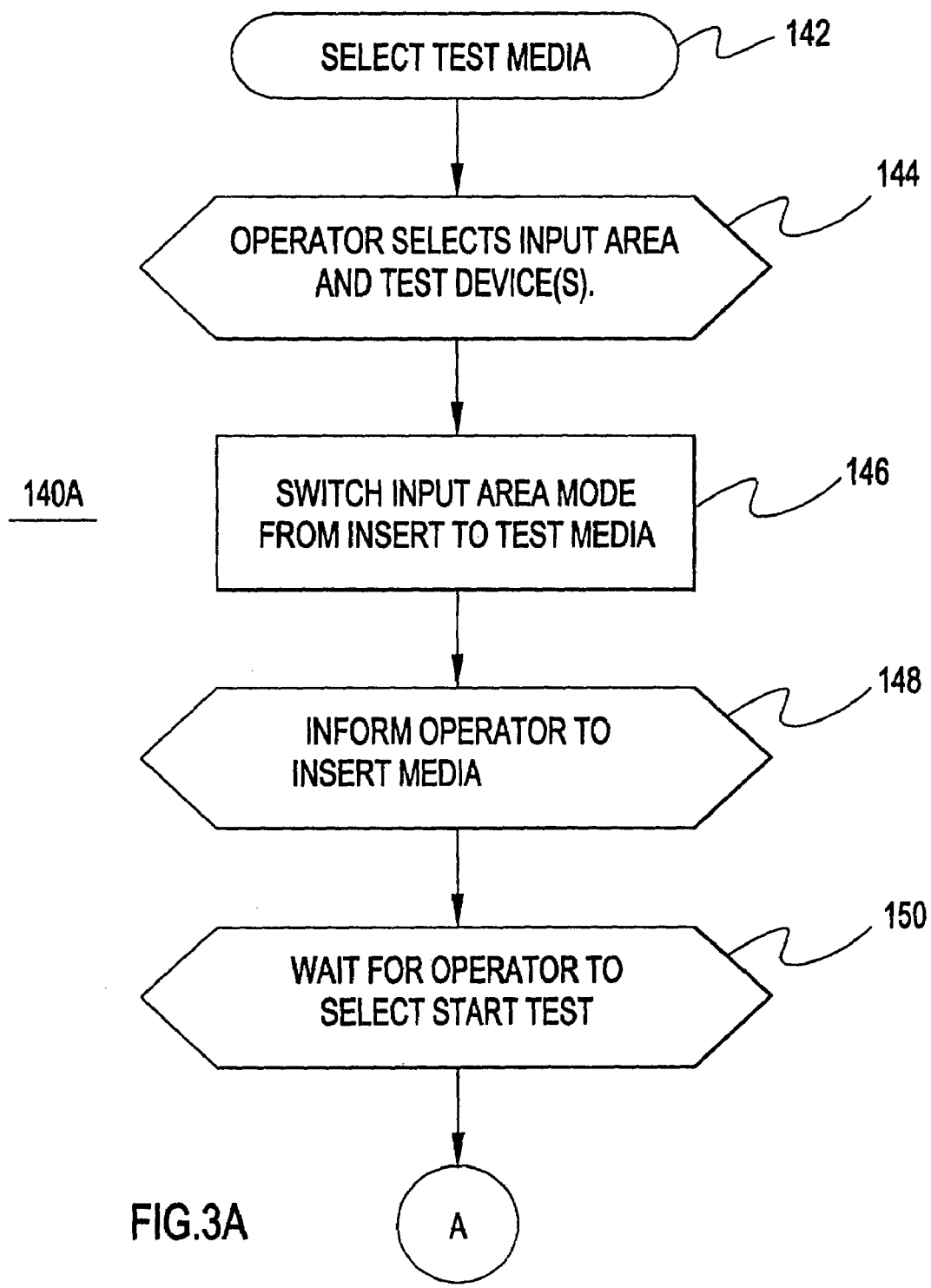
FIGS. 3A–C show a flow diagram providing an example of testing storage media in a preferred data storage system or subsystem prior to inclusion in the local data storage library.
Figure 3B:
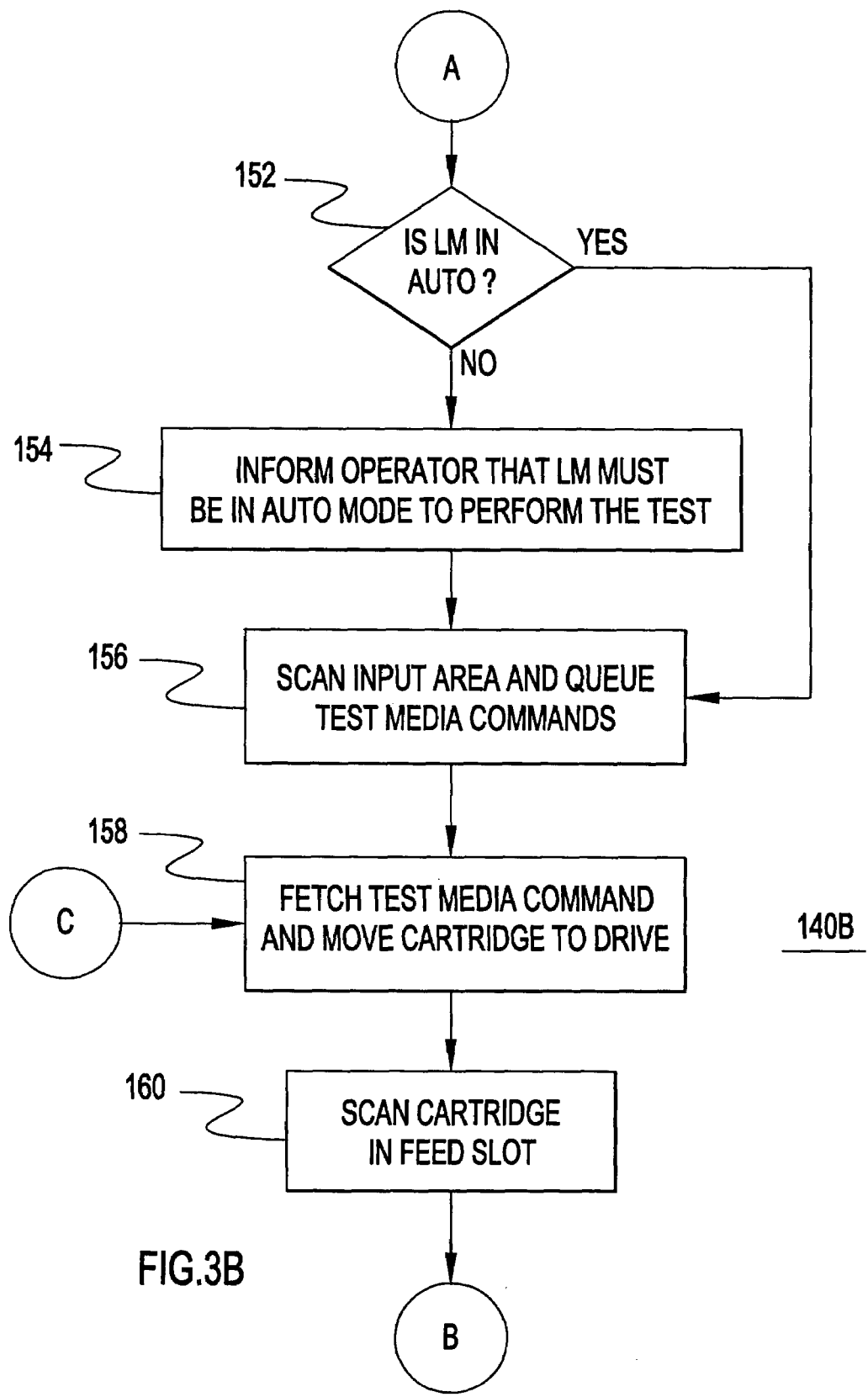
Figure 3C:
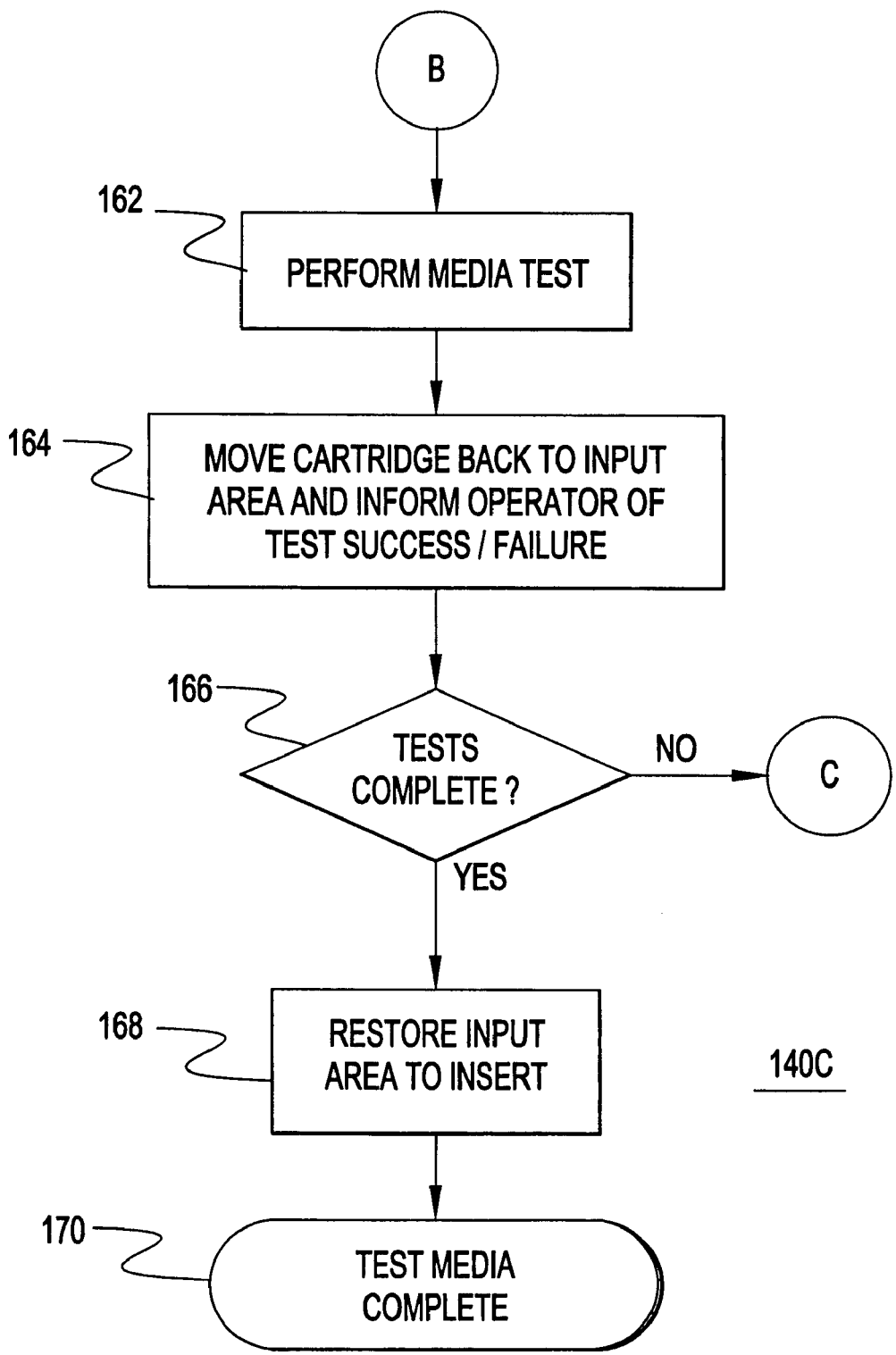

FIGS. 3A–C show a flow diagram 140A–C, respectively, providing an example of how storage media is tested without and/or before inclusion in the local data storage library with reference to the subsystem 100 example of FIG. 1 and system example 130 of FIG. 2. First in step 142 the operator selects to the test media. Then, beginning in step 144 the operator selects the input area and test devices, e.g., convenience I/O station 116, or bulk rack 106. In step 146 the input area mode is changed from insert mode to test media mode to prevent the adding the information to the library manager database (124 in FIG. 2) for cartridges that will be inserted for testing. In step 148 the operator is instructed to insert the test media for testing. The operator starts the test in step 150, queuing a Start Test command.

So, in step 152 the library manger 122 is checked for automatic mode of operation. If the library manger 122 is not in automatic mode, then in step 154 the operator is instructed to place the library manger in auto mode. Once the library manger is in auto mode, whether placed in auto mode in response to step 20 154 or if found in auto mode in step 152, the media test begins in step 156, queuing test media commands into the library command queue, e.g., in library manager database 124, for every cartridge found in the media input area. In step 158, the test media command is fetched from the queue for execution and, the accessor 108 moves the media from the input area 106 or convenience I/O station 116 to one of the selected drives 102. In step 160 the bar code reader 112 scans the feed slot to read the label of the media just inserted and the system is ready to test the media in step 162. When the label is read, the test device is directed to mount the media. When the mount completes, the issuer of the initial command is informed the device is ready and that the label was read. In step 164 the operator is provided with test information indicating success or, failure of the test media command with indications of the type of failure, e.g., a failure message indicating that a volume failed to load into a drive 102. Thus, the operator can easily identify which media is good or bad.

After the media test completes, the accessor 108 returns the media to its original input area cell, i.e., in bulk storage rack 106 or in convenience I/O station 116, and the operator informed that the test has completed. In step 166 the queue is checked for additional test media commands and, if any remain in the queue, returning to step 158 the next media is fetched for testing. Otherwise, in step 168 the input area is restored for the next media insertion. In step 170, having complete media testing, the system 100 returns to normal operation.

Advantageously, by avoiding normally storing volumes in storage cells just for testing, a preferred storage subsystem saves time. Furthermore, the media may be tested even if there is no available permanent rack space to hold the media, because the cartridge being tested is moved directly from the media input area to the drive, i.e., bypassing the permanent rack space.

While the invention has been described in terms of preferred embodiments, those skilled in the art will recognize that the invention can be practiced with modification within the spirit and scope of the appended claims.

What is claimed is:

1. A method of testing storage media in a storage device, said method comprising the steps of:
    a) inserting a physical storage volume into an input area in a storage device;
    b) scanning an input area on said physical storage volume;
    c) moving said physical storage volume to a drive capable of testing storage media in said physical storage volume;
    d) testing said storage media; and
    e) returning tested said physical storage volume to said input area, wherein tested said storage media are tested without being inserted into a library database for said storage device.

2. A method of testing storage media in a storage device as in claim 1, wherein the step (a) of inserting said physical storage volume comprises the steps of:
    i) selecting storage media for test;
    ii) selecting an input area for inserting said physical storage volume;
    iii) inserting said physical storage volume into said selected input area; and,
    iv) waiting to start testing.

3. A method of testing storage media in a storage device as in claim 2, wherein the step (a) of inserting said physical storage volume further comprises the step of:

v) determining whether a library manager is in automatic mode.

4. A method of testing storage media in a storage device as in claim 3, wherein the step (a) of inserting said physical storage volume further comprises the step of:
   v) indicating that said library manager must be in automatic mode before proceeding to scanning step (b).

5. A method of testing storage media in a storage device as in claim 1, wherein the step (b) of scanning die input area further comprises queuing scanned physical storage volumes for testing.

6. A method of testing storage media in a storage device as in claim 1, wherein the step (c) of moving said physical storage volume comprises fetching a test media command and moving said physical storage volume responsive to said test media command.

7. A method of testing storage media in a storage device as in claim 1, wherein the testing step (d), further comprises:
   i) determining if additional physical storage volumes are inserted for testing; and,
   ii) returning to moving step (c) for testing any remaining inserted said physical storage volumes.

8. A method of testing storage media in a storage device as in claim 1 further comprising the steps of:
   f) inserting logical volumes on tested said storage media into a data library, inserted logical volumes in said data library being accessible by host devices.

9. A method of testing storage media in a storage device as in claim 8, wherein step (f) of inserting logical volumes into said data library comprises loading said storage media into a configuration database.

10. A method of testing storage media in a storage device as in claim 1, wherein test results are reported to an operator.

11. A computer program product for testing storage media independent of inclusion in a data library, said computer program product comprising a computer usable medium having computer readable program code thereon, said computer readable program code comprising:
   computer readable program code means for managing and administering data in a data library, data in said data library being stored on removable storage media;
   computer readable program code means for scanning an input area on test storage media and queuing corresponding test media commands for scanned said test storage media;
   computer readable program code means for selectively testing scanned said test storage media and indicating test results; and
   computer readable program code means for moving tested said scanned removable storage media to an input area, wherein said tested storage media are tested without being inserted into a library database for said data library.

12. A computer program product for testing storage media as in claim 11, wherein said computer readable program code means for selectively testing test media comprises:
   computer readable program code means for selecting said scanned test storage media stored in said input area;
   computer readable program code means for directing transport of selected said scanned test storage media from said input area to a media drive; and
   computer readable program code means for testing media in said media drive.

13. A computer program product for testing storage media as in claim 12, further comprising:
   computer readable program code means for determining whether all said scanned test storage media has been tested; and
   computer readable program code means for selecting a next said scanned test storage media responsive to a determination that all said scanned test storage media have not been tested.

14. A storage subsystem for storing and administering data in a data library, said storage subsystem capable of testing removable storage media comprising:
   a bulk input rack storing removable storage media inserted in a data library and test storage media;
   a plurality of storage media drive units accessing data in a data library stored on said removable storage media;
   an accessor selectively moving ones of said removable storage media and said test storage media to a selected one of said one or more drive units;
   a visual input unit reading media identification information on selected said removable storage media and said test storage media; and
   at least one of said plurality of storage media drive units testing a selected said test storage media, wherein said selected test storage media are tested without being inserted into said library.

15. A storage subsystem as in claim 14, further comprising;
   a virtual media server maintaining virtual drives and a virtual server database, said virtual drives containing library data from said removable storage media; and
   a library manager controlling said accessor and maintaining a library manger database.

16. A storage subsystem as in claim 15, wherein said library manger automatically selects and tests said test storage media.

17. A storage subsystem as in claim 14, further comprising an input/output (I/O) station for operator input.

18. A storage subsystem as in claim 14, wherein said removable storage media and test storage media are magnetic tape on magnetic tape cartridges.

19. A storage subsystem as in claim 18, wherein visual input unit is a bar code scanner scanning a bar code label on each of said magnetic tape cartridges.

20. A storage system including a storage subsystem as in claim 14, said storage system connectable to a network and further comprising:
   at least one host system interfaced with said storage subsystem;
   a configuration database associating removable storage volumes in said storage subsystem coupled to said host system; and
   a management database providing data management information for data on said removable storage volumes, each said selected test storage media being tested transparently to each said host system.

* * * * *